United States Patent [19]
Najmolhoda

[11] Patent Number: 5,921,526
[45] Date of Patent: Jul. 13, 1999

[54] PROPORTIONAL VARIABLE FORCE SOLENOID CONTROL VALVE AND TRANSMISSION FLUID CONTROL DEVICE

[75] Inventor: Hamid Najmolhoda, Grandville, Mich.

[73] Assignee: Saturn Electronics & Engineering, Inc., Auburn Hills, Mich.

[21] Appl. No.: 08/777,461

[22] Filed: Dec. 30, 1996

Related U.S. Application Data

[62] Division of application No. 08/337,613, Nov. 10, 1994, Pat. No. 5,611,370.

[51] Int. Cl.$^6$ .................................................. F16K 31/08
[52] U.S. Cl. .................. 251/65; 251/129.08; 251/129.14
[58] Field of Search ................................ 251/65, 129.08, 251/129.14; 335/229, 262

[56] References Cited

U.S. PATENT DOCUMENTS

| | | | |
|---|---|---|---|
| 3,738,578 | 6/1973 | Farrell | 251/65 X |
| 3,861,644 | 1/1975 | Knape | 251/129.21 X |
| 4,071,042 | 1/1978 | Lombard et al. | 251/65 X |
| 4,326,696 | 4/1982 | Isikawa et al. | |
| 4,527,592 | 7/1985 | Dotti et al. | |
| 4,578,662 | 3/1986 | Slavin et al. | 335/262 |
| 4,690,371 | 9/1987 | Bosley | |
| 4,767,097 | 8/1988 | Everett | |
| 4,863,142 | 9/1989 | Hendrixon | |
| 4,946,009 | 8/1990 | Knutson | |
| 4,966,195 | 10/1990 | McCabe | |
| 4,988,074 | 1/1991 | Najmolhoda | 251/129.08 |
| 5,051,631 | 9/1991 | Anderson | |
| 5,060,695 | 10/1991 | McCabe | |
| 5,240,227 | 8/1993 | Sich | |
| 5,322,260 | 6/1994 | Forbes et al. | 251/129.14 |
| 5,358,215 | 10/1994 | Buth et al. | |
| 5,414,398 | 5/1995 | Schumacher | 251/129.15 X |
| 5,513,832 | 5/1996 | Becker et al. | 251/129.15 X |

FOREIGN PATENT DOCUMENTS

| | | |
|---|---|---|
| 0485737 | 5/1992 | European Pat. Off. |
| 4206210 | 9/1993 | Germany |
| 4228045 | 3/1994 | Germany |
| 91/124528 | 8/1991 | WIPO |

*Primary Examiner*—Gerald A. Michalsky
*Attorney, Agent, or Firm*—Edward J. Timmer

[57] ABSTRACT

A proportional variable force solenoid valve for controlling the pressure of a pressurized fluid in a fluid control system in proportion to the current level of an electrical input signal comprises a movable valve for controlling the pressure of pressurized fluid in the fluid control system and a solenoid for controlling movement of the valve in linear proportion to the current level of the electrical signal. The movable valve and the solenoid are disposed in a common substantially non-magnetic housing to provide a fluid control unit. The housing may comprise an aluminum casting for insertion in an aluminum transmission body. A movable armature of the solenoid may comprise a cylindrical shaped permanent magnet, rather than a ferromagnetic armature, in order to eliminate the need for a axially magnetized permanent magnet ring. A simplified armature suspension structure, fluid diverting valve mechanism, and electromagnetic flux washer are incorporated.

11 Claims, 4 Drawing Sheets

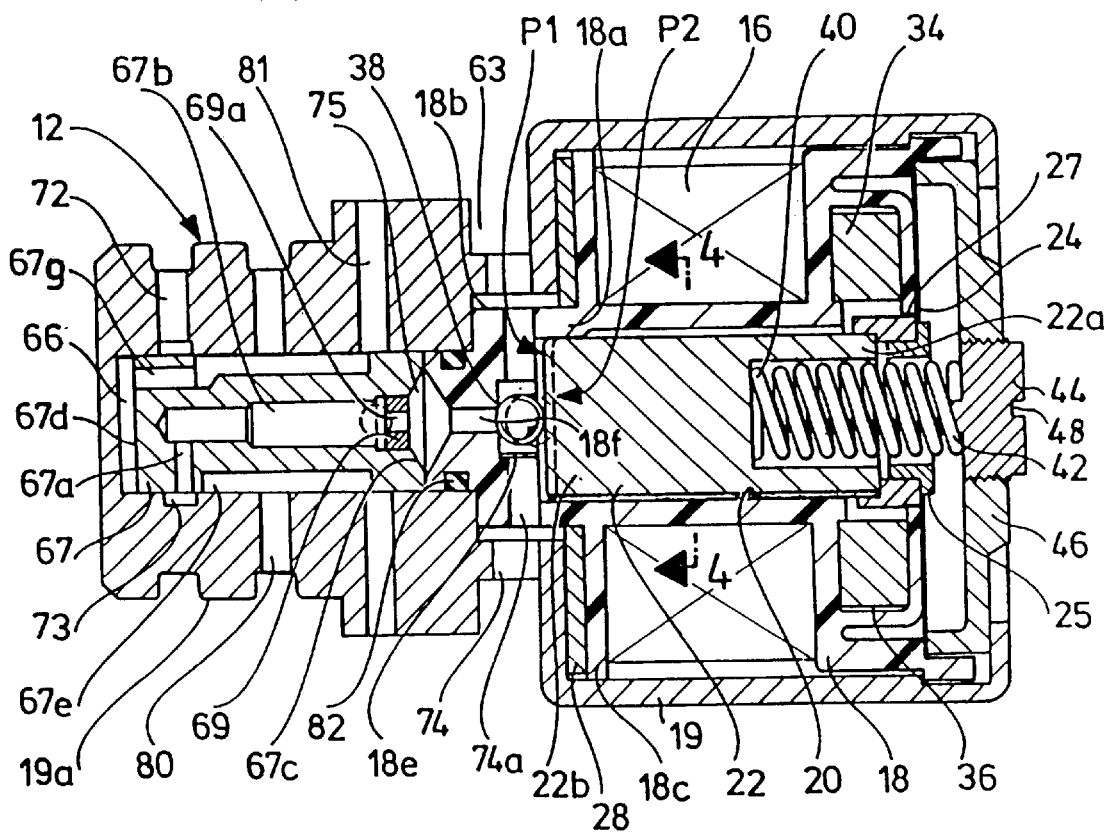
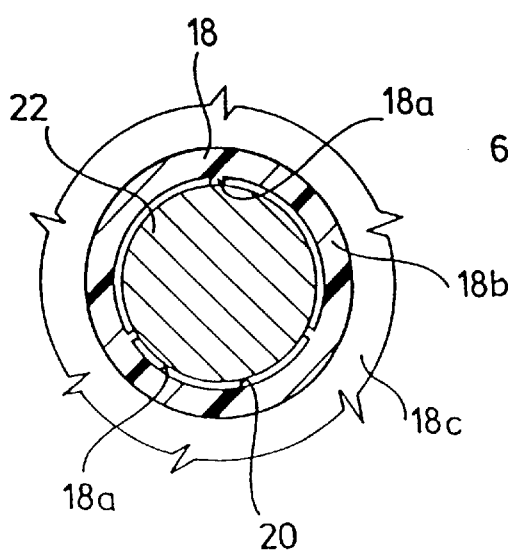

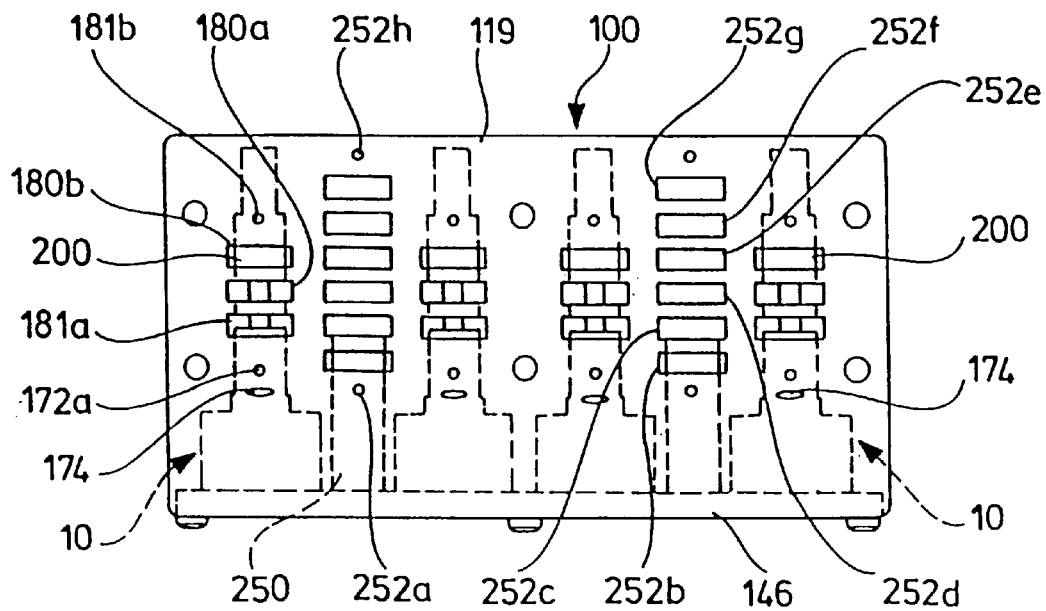
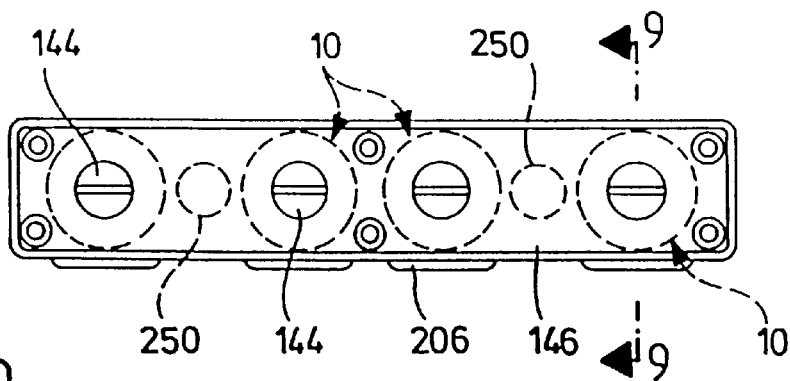
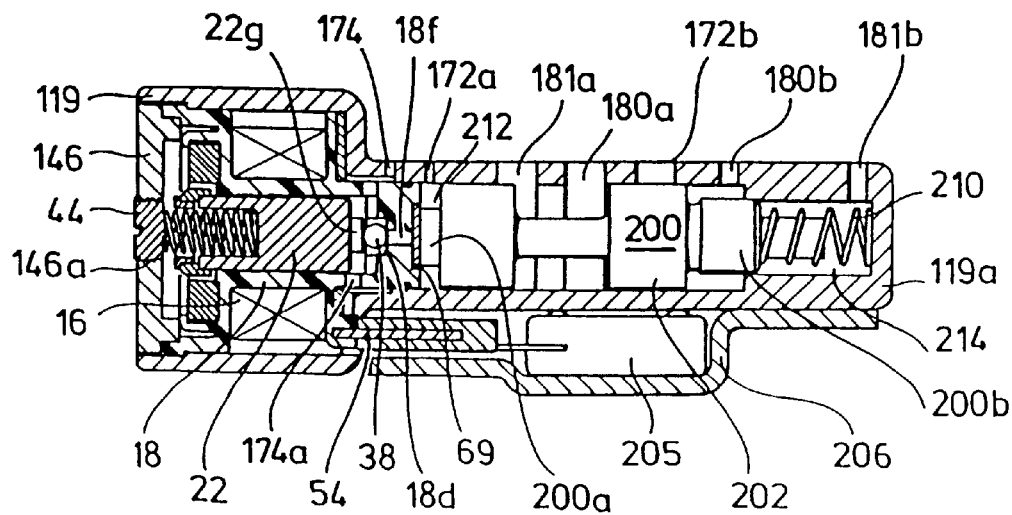

PROPORTIONAL VARIABLE FORCE SOLENOID CONTROL VALVE AND TRANSMISSION FLUID CONTROL DEVICE

This is a division of Ser. No. 08/337,613, filed Nov. 10, 1994, now U.S. Pat. No. 5,611,370.

FIELD OF THE INVENTION

The present invention relates to a control valve for regulating fluid pressure and, more particularly, to a proportional variable force solenoid operated valve wherein the pressure is regulated by a variable force which is proportional to the magnitude of electrical current applied to the solenoid.

While proportional variable force solenoid control valves are employed in various fluid control applications, a typical application involves modulation of main line fluid pressure in an electronic transmission to control the smoothness of shifting between gears of the electronic transmission. In particular, a fluid control device for an electronic transmission is provided and includes a transmission spool valve and a proportional variable force solenoid fluid control valve operably disposed in a common housing and responsive to an electrical signal to regulate fluid pressure in a manner to smooth shifting of the transmission at a particular shifting point.

BACKGROUND OF THE INVENTION

A proportional variable force solenoid control valve that is relative low in cost to manufacture and compact in size while maintaining substantially linear proportional fluid control is described in the Najmolhoda U.S. Pat. No. 4,988,074 issued Jan. 29, 1991, of common assignee herewith. The patented proportional variable force solenoid control valve comprises an outer steel solenoid housing and a cast aluminum valve member housing joined together mechanically such as by tabs on the steel solenoid housing being crimped about regions of the aluminum valve member housing.

The proportional variable force control valve includes a ferromagnetic (e.g. steel) armature suspended by low spring rate springs at opposite ends of the armature within the bore hole of a coreless solenoid bobbin for reciprocable movement between positions corresponding to a closed valve position and fully open valve position in response to applied electrical current to an electromagnetic coil. The position of the armature is controlled by balancing the variable force of an electromagnetic field of an electromagnetic coil and the force of the magnetic field of a permanent ring magnet against the force of a compression coil spring which biases the valve toward the closed position of the valve. The electromagnetic coil, bobbin and armature reside in the steel solenoid housing in a manner that the steel housing provides a concentration of flux of the electromagnetic field at a steel fluid control valve fixed on the armature. The fluid control valve fixed on the end of the armature moves relative to a valve seat disposed in the aluminum valve housing to communicate a fluid inlet to fluid exhaust ports so as to regulate fluid pressure at fluid control ports in a manner proportional to the magnitude of applied electrical current.

A commercially manufactured version of the aforementioned patented proportional variable force solenoid fluid control valve has been modified to include a stainless steel ball valve and a separate stainless steel valve seat insert pressed in the nozzle. The ball valve is captured in a stainless steel cage press fit in nozzle between the valve seat insert and a rod-like, cylindrical shaped steel armature that moves relative to the valve seat in a manner proportional to the magnitude of electrical current applied to the electromagnetic coil. As the armature moves relative to the valve seat to open the valve, the ball valve is caused to follow the end of the armature by virtue of fluid pressure in the valve member housing and confinement in the ball valve cage in the bobbin. The fluid inlet is communicated to fluid exhaust ports by opening of the ball valve so as to regulate fluid pressure at fluid control ports in a manner proportional to the magnitude of electrical current applied to the coil.

A spool valve is disposed in the valve member housing for providing a two stage, high flow capability operation wherein pressurized fluid supplied to the inlet port initially is directed to bypass the control ports and flows to an end of the spool valve to move it from a zero fluid flow spool position to a maximum fluid flow spool position relative to the control ports as determined by the cracking pressure preset for the ball valve by adjustment of the coil spring force. Thereafter, a second stage of operation involves controlling the fluid flow through the control ports by moving the spool valve between minimum and maximum flow spool positions by armature movement in a manner proportional to the magnitude of electrical current to the coil. Such proportional variable force solenoid control valves commercially manufactured to-date are operably mounted to a cast aluminum transmission body or case by a clamp plate, bolt, or both engaging an outer nozzle groove.

An object of the present invention is to provide an improved proportional variable force solenoid fluid control valve of the type described hereabove wherein construction of the solenoid and valve components is further simplified while maintaining substantially linear proportional fluid control.

Another object of the present invention is provide an improved proportional variable force solenoid control valve having a common housing for the solenoid and the valve member components that can be inserted in a transmission body or case as a unit and retained in operative position by a simple plate or the like.

Still a further another object of the invention is to provide an improved proportional variable force solenoid control valve having a simplified armature suspension structure for positioning the armature within the bore hole of the solenoid bobbin for reciprocable movement with a low spring rate spring at only one end of the armature while maintaining linear proportional fluid control.

Still a further object of the present invention is to provide an improved proportional variable force solenoid control valve having an elastomeric ball valve and ball valve seat molded on the bobbin to provide improved performance (e.g. reduced resonance in fluid pressure regulation) at low line pressure and high temperature operation to maintain linear proportional fluid control.

Still an additional object of the present invention is to provide a simplified proportional variable force solenoid control valve that eliminates the need for a permanent ring magnet by virtue of employing a permanent magnet armature suspended for reciprocable movement in the bore hole of the electromagnetic coil without an air gap so as to maintain substantially linear proportional control of fluid pressure.

Still another object of the invention is to provide a fluid control device for a shift point of an electronic transmission wherein a proportional variable force solenoid control valve and a transmission spool valve operably associated are disposed in a common housing to provide regulated fluid pressure to smooth gear shifting at a particular shifting point of the transmission.

SUMMARY OF THE INVENTION

The present invention provides a proportional variable force solenoid fluid control valve for controlling the pressure of a pressurized fluid in a fluid control system in proportion to the current level of an electrical input signal. The proportional variable force solenoid fluid control valve comprises in one embodiment of the invention a movable valve for controlling the pressure of pressurized fluid in the fluid control system, a solenoid for controlling movement of the movable valve, and a common housing in which the movable valve and the solenoid are disposed.

The proportional variable force solenoid fluid control valve typically comprises a solenoid that includes an electromagnetic coil connected to an electrical input signal for generating an electromagnetic field and an armature disposed in a longitudinal coil bore hole for movement between first and second axial positions in response to the current level of the electrical input signal. The armature can comprise a cylindrical shaped ferromagnetic member or, alternately, a cylindrical shaped permanent magnet member biased toward the first position by a coil spring or other resilient biasing means. Use of the permanent magnet armature is advantageous for eliminating the need for an axially magnetized permanent ring magnet otherwise used in conjunction with the ferromagnetic armature.

The solenoid and valve components are disposed in a common housing to provide a compact fluid control unit. The common housing preferably comprises a substantially non-magnetic material having little or no magnetic permeability, for example, as compared to that of a ferromagnetic material. For example, a housing made of aluminum, cast aluminum alloy or thermoplastic in the desired housing configuration can be used in practice of the present invention. An unbroken, annular flux washer is disposed at an end of the bobbin for concentrating electromagnetic flux at the end of the armature engaging the valve.

The movable valve in a particular embodiment of the invention comprises a spool valve movable in the housing relative to at least one control port. The proportional variable force solenoid valve includes a fluid diverting valve operably engaged by an armature of the solenoid for diverting fluid from an end of the spool valve to control its movement relative to a control port. The fluid diverting valve may comprise an elastomeric ball valve disposed between an end of the armature and a valve seat molded on the plastic bobbin to provide improved performance (e.g. reduced resonance in fluid pressure regulation) at low line pressure and high temperature operation to maintain linear proportional fluid control. The ball valve preferably comprises a high durometer elastomeric material.

The armature in another particular embodiment of the invention is suspended in the longitudinal bore hole of the electromagnetic coil by an improved armature suspension structure that includes a plate spring connected to one end of the armature for suspending it in the longitudinal bore hole while the other end of the armature is unsupported by a spring plate and instead is guided by a plurality of longitudinally extending armature guide ribs formed (e.g. molded) on the bobbin in the bore hole.

The present invention also provides a fluid control device for an electronic transmission wherein a secondary transmission spool valve and a proportional variable force solenoid fluid control valve are operably disposed in a housing to provide regulated fluid pressure for a particular shifting point of the transmission. A plurality of such transmission spool valve/proportional variable force solenoid fluid control valve sets can be provided in the housing for each shifting point of the electronic transmission.

The foregoing and other objects, features, and advantages of the invention will become apparent from the following more detailed description taken with the accompanying following drawings.

BRIEF DESCRIPTION OF THE DRAWINGS

FIG. 3 is a view in longitudinal cross section of FIG. 1.

FIG. 4 is a view in transverse cross section taken along line 4—4 of FIG. 3.

FIG. 5 is a partial longitudinal cross section of a bobbin modified to include a fluid flow plug press fit in the bobbin rather than the spool valve member.

FIG. 7 is a plan view of a transmission fluid control device pursuant to an embodiment of the invention wherein a plurality of proportional variable force fluid control valve/transmission spool valve sets are disposed in a common housing.

FIG. 8 is an end elevational view of the assembly of FIG. 7.

FIG. 9 is a view in longitudinal cross section taken along lines 9—9 of FIG. 7.

DESCRIPTION OF THE INVENTION

Figure 1:
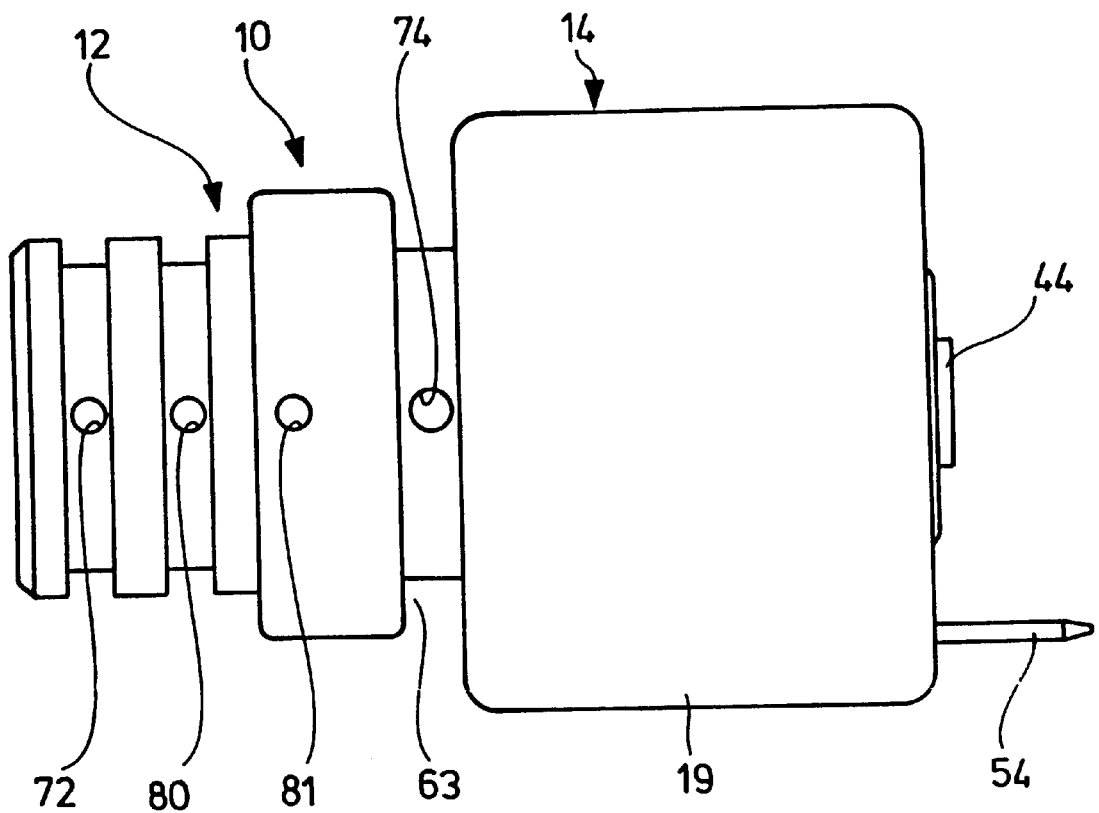
FIG. 1 is a plan view of a proportional variable force solenoid fluid control valve in accordance with an embodiment of the invention.

Referring to FIGS. 1–4, the proportional variable force solenoid fluid control valve 10 includes valve member 12 and solenoid 14 disposed in a common housing 19 to provide a compact fluid control unit. The housing 19 preferably comprises a substantially non-magnetic housing material having little or no magnetic permeability, for example, as compared to the magnetic permeability of a ferromagnetic material, such as steel. A material particularly suited for the housing 19 comprises aluminum and its alloys or thermoplastics formed by casting or injection molding to required housing configuration to receive the valve member 12 and the solenoid 14.

An aluminum housing 19 offers benefits of low cost material and ready manufacture. Although aluminum and its alloys are particularly preferred for fabrication of the housing, the invention is not so limited and can be practiced using other housing materials that include, but are not limited to, magnesium based alloys, austenitic stainless steel, plastics, and other substantially non-magnetic materials having little or no magnetic permeability as compared to that of steel. Although less preferred, ferromagnetic materials, such as steel, can be used for the common housing material in applications where the loss or drain of the electromagnetic magnetic field and permanent magnetic field by the presence of magnetically permeable housing material does not adversely affect operation of the proportional variable force solenoid fluid control valve 10.

Placement of the valve member 12 and solenoid 14 in a common housing 19 is advantageous for eliminating the separate steel shell heretofore employed in manufacture of proportional variable force solenoid fluid control valves and the need to mechanically join the shell and the cast aluminum valve member housing by mechanical crimping of the tabs on the steel shell against the valve member casting.

The solenoid 14 includes an electromagnetic coil 16 wound about a molded plastic bobbin 18 which has a cylindrically shaped bore hole 20 through the longitudinal axis thereof. The bobbin 18 is made of glass filled thermoplastic. A rod-like, solid, cylindrical shaped armature 22 formed of ferromagnetic material, such as steel, is suspended within the bore hole 20 of the plastic bobbin 18 by a thin low spring rate plate spring 24 mounted at a rear end 22a of the armature 22. The plate spring 24 is of the type described in U.S. Pat. No. 4,988,074, the teachings of which are incorporated herein by reference. That is, the spring plate is formed from very thin non-magnetic austenitic stainless steel, such as full hard austenitic stainless steel, which provides a very low rate spring for the spring configuration shown in FIG. 5 of the aforementioned '074 patent. The inner periphery of the plate spring 24 is mounted by half hard brass plate retainer 25 and half hard brass magnet retainer 27 to the rear end 22a of the armature 22 so as to suspend the armature 22 for free axial longitudinal movement within the bobbin 18 while leaving the opposite front end 22b of the armature unsupported by a spring plate. The outer periphery of the plate spring 24 is mounted between the housing 19 and a aluminum alloy end cap 46 (Al alloy 6061 T6). A plurality of longitudinally extending armature guide ribs 18a are formed (e.g. molded) on the bobbin inner wall so as to extend radially inward and longitudinally or axially to guide axial movement of the armature in the bore hole 20. As shown best in FIG. 4, the guide ribs 18a are molded in circumferentially spaced relation on the inner wall of the bobbin 18 and typically are spaced equidistantly apart in the circumferential direction. There is a small clearance between the armature outer diameter and the coil bore hole, providing a small clearance between the rib inner diameter and armature outer diameter. The guide ribs 18a extend axially along a portion of the length of the bore hole 20 proximate the front end 22a of the armature 22.

Use of the armature suspension structure described hereabove permits elimination of the spring plate and associated plate mounting components heretofore employed to suspend the front end 22b of the armature 22 in the bobbin 18 to simplify construction and manufacture of the proportional variable force solenoid control valve 10 without adversely affecting its hysterisis characteristics. The spring plate 24 and the guide ribs 18a provide for longitudinal movement of the armature 22 in the bobbin 18, while at the same time isolating the armature 22 from noise, vibration, and interference with the remaining structure of the solenoid 14.

An unbroken, annular steel flux washer 28 (e.g. cold rolled 1008 or 1010 carbon steel) is disposed at the front end 18b of the bobbin 18 for concentrating electromagnetic flux of the electromagnetic coil 16 at the front end 22b of the armature 22. The flux washer 28 resides between an end flange of the housing 19 and a radial flange 18c of the bobbin 18 and is not a split, two-piece washer as heretofore employed to concentrate electromagnetic flux at the armature end 22b. As shown best in FIG. 3, the front end 22b of the armature 22 engages an elastomeric ball valve 38 that cooperates with a valve seat 18d molded on the bobbin 18. The ball valve 38 and valve seat 18d define a fluid diverting valve for diverting fluid to an exhaust port in a manner described herebelow.

The ball valve 38 is received and confined laterally in a flat-sided recess or cage 18e molded in the bobbin 18 between the front end 22b of the armature 22 and the valve seat 18d molded on the bobbin 18. In this valve arrangement, the ball valve 38 is biased against the armature end 22b and follows movement of the armature 22 in a direction toward or away from the valve seat 18d by virtue of the fluid pressure on the ball valve and by virtue being captured in the cage 18e. The ball valve 38 is made of a high durometer elastomer having a durometer value of 80 or higher. Use of the high durometer elastomeric ball valve 38 and molded bobbin valve seat 18d is advantageous for eliminating resonance in the regulation of fluid pressure due to low line fluid pressure at high temperature, a condition that can occur during hot operation of an electronic transmission wherein the fluid is thinned and that can result in non-linear fluid control characteristics.

An axially magnetized ring magnet 34 is disposed in an annular recess 36 at the rear end of the bobbin 18 axially rearward of the coil 16. Ring magnet 34 is formed of rare earth permanent magnet material permitting use of a reduced size magnet that results in a compact solenoid and enhanced stability, such as reduced loss of magnetism at elevated temperatures. Ring magnet 34 produces a permanent magnetic field that substantially saturates the armature 22 even in the absence of electrical current to the coil 16. Thus, a relatively smaller electromagnetic field is required to move the armature 22 between the axial positions shown in FIG. 3 where a first axial position P1 of the front armature end 22b is shown in solid lines and a second axial position P2 of the armature end 22b is shown in dashed lines for convenience. As is apparent, the first axial position of the armature 22 corresponds to a closed valve position where the ball valve 38 is seated on the valve seat 18d, while the second axial position corresponds to an open valve position.

A coil spring 42 is trapped between the spring retainer counterbore 40 and a half hard brass cap screw 44 threadably received in a threaded central aperture of the aluminum alloy end cap 46 (Al alloy 6061 T6). The outer end of the cap screw 44 includes a tool socket 48 providing means for adjusting the force exerted by the coil spring 42 on the armature 22 and thus the cracking pressure of the ball valve 38 using a tool, such as a screw driver wrench. The cap screw 44 is used to adjust the cracking pressure of the ball valve 38.

Figure 2:
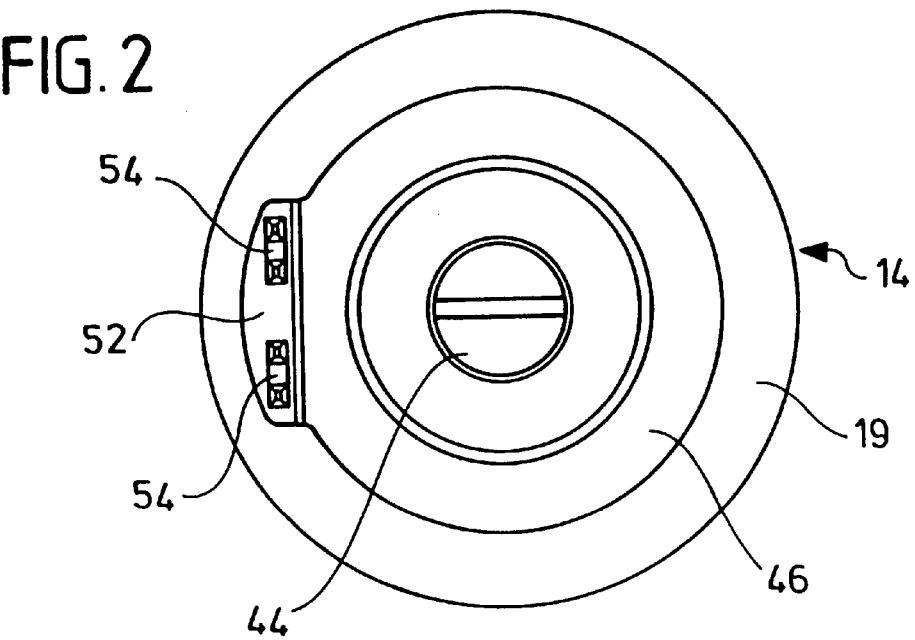
FIG. 2 is an end elevational view of the proportional variable force solenoid fluid control valve of FIG. 1.

A plastic connector body 52 shown in FIG. 2 is mounted on the bobbin 18 and exits the housing 19 at a rear end thereof. Although not shown in FIG. 3, electrical contacts 54 extend through the bobbin 18 and through apertures in the connector body 52. Such electrical contacts 54 are shown in the aforementioned U.S. Pat. No. 4,988,074. The ends of the electrical contacts 54 are connected to the wires of the electromagnetic coil 16 for receiving an electrical current signal from a variable current source (not shown).

The valve member 12 shares with the solenoid 14 the same housing 19 such that the need for separate a solenoid shell and valve member housing, mechanical connection of the solenoid shell and valve member housing together, and elastomeric diaphragm movable with the valve as required heretofore in aforementioned U.S. Pat. No. 4,988,074 is eliminated. The valve member 12 includes a housing nozzle section 19a formed (e.g. cast) integrally with the common housing 19. The nozzle section 19a includes a longitudinal passageway 66 having a cylindrical configuration for receiving the front end 18b of the bobbin 18 and an aluminum alloy spool 67 (e.g. Al alloy 6262) which is received in the passageway 66 in a close fit, sliding manner for axial reciprocable movement.

The nozzle section 19a of the common housing 19 includes a pressurized fluid supply or inlet port 72, a plurality of control ports 80, a plurality of first exhaust ports 81 associated with the control ports, and a plurality of second exhaust ports 74 associated with the ball valve 38. These ports can be cast, machined or otherwise formed in the nozzle section 19a. The control ports 80, exhaust ports 81, and exhaust ports 74 are spaced circumferentially about the nozzle section 19a. Typically, two control ports 80, four exhaust ports 81, and four exhaust ports 74 are provided on the nozzle section 19a.

The front end 18b of the bobbin 18 includes exhaust ports 74a that communicate with the respective exhaust ports 74 of the nozzle section 19a via an annular chamber formed between the cylindrical front end 18 of the bobbin and the reduced diameter portion of the nozzle section 19a.

The inlet port 72 communicates with an annular chamber 73 that, in turn, is in communication with a radial fluid passage 67a of the spool 67 as shown best in FIG. 3. Passage 67a communicates with a longitudinal central passage 67b of the spool 67. A flow plug 69 made of brass is press fit in the spool valve so as to reside in the passage 67b and includes an orifice 69a sized to provide laminar flow of fluid to the chamber 75 and orifice 18f of the bobbin 18. Alternately, the flow plug 69 can be press fit in the bobbin 18 so as to reside in the orifice 18f as shown in FIG. 5.

The chamber 75 is defined between the front end 18b of the bobbin 18 and the facing rear end 67c of the spool 67. The chamber 75 communicates to an orifice 18f of the bobbin 18 that, in turn, communicates to the valve seat 18d molded on the bobbin. An O-ring seal 82 is disposed about the front end 18b of the bobbin 18 between the housing 19 and the bobbin front end 18b to prevent fluid by-pass around the ball valve 38.

Annular notch or channel 63 is formed on the exterior of the housing 19 at the nozzle section 19a to receive a fastener clip or plate (not shown) for securing the nozzle section 19a to the cast aluminum transmission body (not shown) or other fluid control system.

The slidable spool valve 67 is disposed in the nozzle section 19a to provide a two stage operation wherein, in the first stage, pressurized fluid is supplied to the inlet or supply port 72 with the forward end of the bobbin 18 and rear end 67c of the spool valve abutted and with the ball valve 38 seated against the valve seat 18d, as shown in FIG. 3, with no electrical current to the coil 16. As a result, the entering fluid flow is caused to bypass the control ports 80 and instead is directed to flow through spool passages 67a, 67b to the chamber 75 (rear end 67c of the spool valve 67). The ball valve 38 initially is seated on the valve seat 18d by virtue of the force of the coil spring 42. The position of the spool valve 67 corresponds to a minimum fluid flow spool valve position relative to the control ports 80 wherein the annular spool control land 67e is not communicated to the inlet port 72. However, once the fluid reaches chamber 75, fluid pressure increases to a level that moves the spool valve 67 to the left in FIG. 3 sufficiently to communicate the annular control land 67e to the inlet port 72. This position of the spool valve 67 corresponds to a maximum fluid flow spool valve position relative to the control ports 80 wherein the annular spool control chamber 67e is communicated to the inlet port 72. Communication of the spool control land 67e with the inlet port 72 also communicates the front end 67d of the spool valve 67 to the inlet port 72 via the passage 67g. Thus, at the maximum fluid flow spool position, the opposite ends 67c, 67d of the spool valve 67 are subjected to equal fluid pressure.

Thereafter, a second stage of operation involves controlling the fluid flow through the control ports 80 by spool valve movement between the aforementioned minimum and maximum flow spool positions. Movement of the spool valve is controlled by diverting fluid from the chamber 75 out of the exhaust ports 74 to vary fluid pressure in chamber 75 in a linear proportional manner. For example, electrical current is supplied to the coil 16 via the contacts 54 to create an electromagnetic field which, in addition to the magnetic field of the ring magnet 34 together with the force of fluid pressure in chamber 75, overcomes the coil spring 42 and slight force of spring plate 24 to move the armature 22 in a linear proportional to the current level applied to the coil 16. Since the ball valve 38 moves with the armature 22, the ball valve 38 will open in linear proportional manner to the current applied to the coil 16 and divert fluid out of the exhaust ports 74 to unbalance fluid pressure on the spool valve member ends 67c, 67d to control the spool valve position in linear proportional manner between the aforementioned minimum and maximum fluid flow spool positions relative to the control ports 80 and exhaust ports 81 of the nozzle section 19a. This provides a controlled fluid flow out of the control ports 80 in direct proportion to the opening of the ball valve 38 in accordance with linear movement of the armature 22 which, in turn, is directly proportional to the amount of electrical current supplied to the coil 16 of the solenoid 14.

Such axial spool movement as described hereabove provides a negative gain mode of fluid flow control wherein there is a linear decrease in fluid pressure at the control ports 80 in proportion to an increase in electrical current to the coil 16. However, a positive gain mode of fluid flow control also can be achieved by the proportional variable force fluid control valve 10 described by reversing the flow of electrical current in the coil 16 such that the electromagnetic field is counter to the magnetic field of the permanent ring magnet 34 and by introducing supply pressure through the inlet port 72 with the ball valve 38 in the full open position as determined by the position of the armature 22 with current flowing in the coil 16. This establishes a minimum fluid flow spool position relative to the control ports 80 where maximum fluid flow is diverted through exhaust ports 74. A maximum fluid flow spool position is established when no current flows to the coil 16. In particular, under a no coil current flow condition, the adjusted force of the coil spring 42 will seat the ball valve 38, or only slightly crack open the ball valve 38, relative to the valve seat 18d and apply fluid at full supply pressure to the end 67c of the spool valve member 67 to move it to a maximum fluid flow spool valve position where the control land 67e is communicated to the inlet port 72. The position of the spool valve member 67 can be varied from the minimum fluid spool position to maximum fluid flow spool valve position directly proportional to the amount of current applied to the coil 16 to provide a positive gain mode of fluid flow control at the control ports 80 wherein there is a linear increase in fluid pressure to the control ports 80 in proportion to an increase in electrical current to the coil 16. In particular, increased electrical current supplied to the coil 16 will cause the armature 22 to move the ball valve 38 against the field of the permanent ring magnet 34 from the full open position toward the closed ball valve position, or cracked open ball valve position.

Referring to FIG. 3, the operation of the proportional variable force solenoid control valve 10 of the present invention in a negative gain mode will be described further. The inlet port 72, exhaust ports 74, and control ports 80 of the nozzle section 19a of the housing 19 are connected to the pressurized fluid system in which pressurized fluid is supplied to the inlet port 72 and flows out of the control ports 80. The ball valve 38 initially is closed or only slightly cracked opened by the force of fluid pressure as explained hereabove. The ball valve 38 is opened by the solenoid 14 as described hereabove to control the position of the spool valve member 67 relative to the control ports 80 and exhaust ports 81 to regulate the pressure of the fluid flowing out of the control ports 80. Opening of the ball valve 38 is controlled by linear displacement of the armature 22 in proportion to the amount of electrical current supplied to the solenoid 14 via the electrical contacts 54. In the normally closed ball valve position P1 as shown in solid lines of FIG. 3 with no current flowing to the coil 16, there is no electromagnetic field, and the coil spring 42 biases the armature 22 to the position P1 wherein the ball valve 38 is seated against the valve seat 18d, thereby preventing the flow of pressurized fluid through the exhaust ports 74. The force of the coil spring 42 is sufficient to overcome the magnetic field of the axially magnetized permanent ring magnet 34 in addition to the force of the pressurized fluid against the ball valve 38.

With the ball valve 38 seated against the valve seat 18d or slightly cracked open, pressurized fluid entering the inlet port 72 flows through the annular chamber 73 through the passages 67a, 67b to move the spool valve to its maximum fluid flow position where the control land 67e is communicated to the inlet port 72 and the spool valve 67 is subjected to equal pressure at opposite ends. This provides maximum fluid out of control ports 80 which can be reduced in a regulated fashion by applying current to the coil 16 via the contacts 54 so as to create an electromagnetic field which, in addition to the magnetic field created by the ring magnet 34 together with the force of pressurized fluid through orifice 18f overcomes the opposing force of the coil spring 42 and the relatively slight force of the plate spring 24, thereby moving the armature 22 toward the position P2 shown in dashed lines in FIG. 3 corresponding to a ball valve open position. This position permits maximum fluid flow out of the exhaust ports 74 and results in the spool valve member moving to its minimum fluid flow position shown in FIG. 3 abutted against the bobbin 18 where the control ports 80 are not communicated to the inlet port 72. The pressure of the fluid out of the control ports 80 thus may be varied directly proportional to the amount of current applied to the coil 16.

For example, in a typical application of the proportional variable force control valve 10 of the invention, the nozzle section 19a of the common housing 19 is inserted into an automobile transmission body or casing to modulate the main line pressure to control several spool valves disposed in an electronic transmission control system thereby controlling the smoothness of shifting between gears of the electronic transmission. In such an application, pressurized fluid is provided to the inlet port 72. The spring force of the coil spring 42 is adjusted via the cap screw 44 to slightly open the ball valve 38 with no current flowing to the coil 16, thereby creating a slight bleed of fluid between the valve seat 18d and the ball valve 38 and out of the exhaust ports 74 and establishing the maximum fluid flow spool valve position. The pressure of the fluid then flowing out of the control ports 80 may be linearly controlled in proportion to the amount of current subsequently provided to the coil 16 via the contacts 54 in the manner described hereabove.

Figure 6:
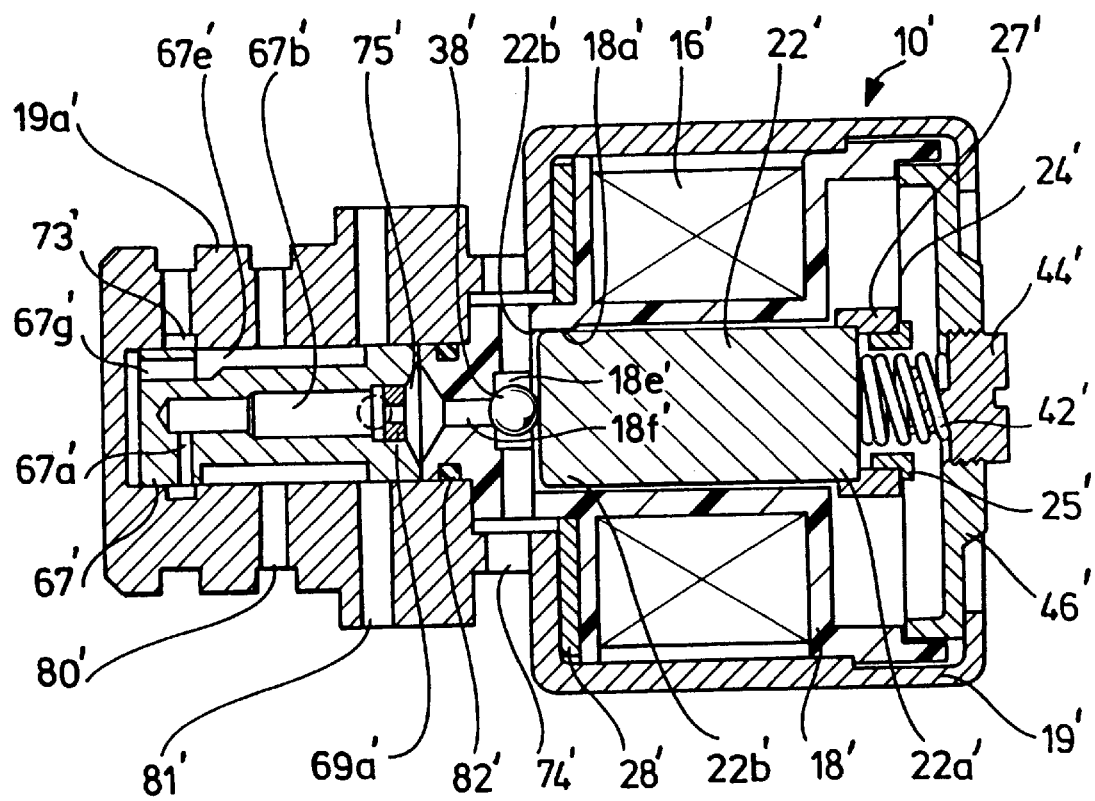
FIG. 6 is a view in longitudinal cross section similar to FIG. 3 of a proportional variable force solenoid fluid control valve in accordance with another embodiment of the invention.

Referring to FIG. 6, another embodiment of the invention is illustrated and differs from the embodiment described hereabove with respect to FIGS. 1–4 to further simply construction of the proportional variable force fluid control valve. In FIG. 6, like reference numerals primed are used to designate like features of FIGS. 1–4. In particular, the embodiment of FIG. 6 includes a permanent magnet armature 22' in lieu of the ferromagnetic armature 22 of FIGS. 1–4. For example, the armature 22' comprises a cylindrical shaped, solid rare earth samarium cobalt permanent magnet (or other permanent magnet material) having improved magnetic characteristics, such as energy product and magnetic stability at elevated temperatures. The armature 22' includes a front end 22b' that engages the ball valve 38' in the same manner as described hereabove with respect to FIGS. 1–4 to control ball movement in conjunction with fluid pressure in the orifice 18f'. Use of the permanent magnet armature 22' permits elimination of the permanent ring magnet 34 employed in the embodiment of FIGS. 1–4 to assist the electromagnetic coil 16 in effecting linear proportional movement of the armature and thus simplification in the construction and manufacture of the proportional variable force fluid control valve 10' shown in FIG. 6.

The permanent magnet armature 22' is biased to the valve closed position by coil spring 42' which engages the flat rear end 22a' of the armature 22', rather than being disposed in the counterbore 40 of the armature 22 of FIGS. 1–4. This too simplifies construction and manufacture of the proportional variable force fluid control valve 10'.

The proportional variable force fluid control valve 10' of FIG. 6 otherwise includes like components as the embodiment of FIGS. 1–4 and functions in like manner to control the pressure of the pressurized fluid at control ports 80' in linear proportion to the current level of the electrical input signal supplied to the coil 16' via the electrical contacts 54'.

Referring to FIGS. 7–9, a fluid control device 100 for an electronic transmission fluid control system is illustrated. In particular, the fluid control device includes a housing 119 preferably comprising a substantially non-magnetic material having little or no magnetic permeability as compared to a ferromagnetic material. The housing 119 can be a cast aluminum housing to this end.

The housing 119 includes a plurality of chambers each receiving a secondary transmission spool valve 200 operably associated with a respective proportional variable force solenoid fluid control valve 10. Each proportional variable force solenoid fluid control valve 10 is similar to that described hereabove with respect to FIGS. 1–4. However, the housing 119 is common to all of the proportional variable force solenoid fluid control valves 10. In FIG. 9, the proportional variable force solenoid fluid control valves 10 include similar features to the proportional variable force solenoid fluid control valve of FIGS. 1–4, and such similar features are represented in FIG. 9 by like reference numerals for convenience.

Each proportional variable force solenoid fluid control valve 10 controls the pressure of fluid applied to the first axial end 200a of its associated secondary transmission spool valve 200 in opposition to the spring force exerted on the second axial end 200b of the transmission spool valve by coil spring 210. To this end, each proportional variable force solenoid fluid control valve 10 is communicated to a chamber 212 receiving the first axial end 200a of the associated spool valve 200, while the coil spring 210 is disposed in a chamber 214 between the housing end wall 119a and the second axial end 200b of the associated transmission spool valve 200. A retainer plate 146 is fastened by screws or other means to the rear of the housing 119 to hold the proportional variable force solenoid fluid control valves 10 and associated transmission spool valves 200 in operable relation. In effect, the retainer plate 146 functions as a common end cap for all of the proportional variable force solenoid fluid control valves 10. To this end, the plate 146 includes threaded apertures 146a in which cap screws 44 are threaded and rendered accessible outside the housing 119 for adjustment of the ball valve cracking pressure.

For each secondary transmission spool valve 200, the housing 119 includes on a wall thereof fluid inlet or supply ports 172a, 172b, control port 180a and control (feedback) port 180b which are communicated with one another via the worm trail on the transmission valve body, first exhaust ports 181a, 181b associated with the control ports, and an exhaust port 174 associated with the ball valve and exhaust port 174a on the bobbin 118. Exhaust ports 174, 181a, 181b are communicated to sump. The transmission spool valve 200 includes the first and second axial ends 200a, 200b and a fluid metering spool region 202 between the axial ends. The fluid metering spool region 202 is disposed proximate the associated control ports 180a, 180b for controlling fluid flow through the control ports in dependence on the axial position of the spool valve 200 in conventional manner.

Each proportional variable force solenoid fluid control valve 10 can be operated in the negative gain mode or positive gain mode as described hereabove to control the position of its associated transmission spool valve 200 relative to the associated control ports 180a, 180b and exhaust ports 181a, 181b to regulate fluid flow pressure out of the control ports in a manner to smooth shifting of the gears of the electronic transmission in response to an electrical signal representative of a particular shifting point. Each set of proportional variable force solenoid fluid control valve/transmission spool valve is operative to smooth shifting of gears at a particular shifting point of the electronic transmission.

To this end, an electrical signal representative of a particular shifting point of the gears is applied by an onboard module to the electromagnetic coil 16 of a particular proportional variable force solenoid valve 10 via its electrical contacts 54 in order to control the axial position of the associated transmission spool 200 in a manner similar to that described hereabove employed to control the position of the aforementioned spool valve 67 (FIGS. 1–4) between a minimum fluid flow spool position and a maximum fluid flow spool position relative to control ports. However, in FIG. 7–9, fluid supply pressure is applied directly to the axial end 200a of each transmission spool valve 200 via a respective supply port 172a, while the axial end 200b of each transmission spool valve 200 is spring biased by the coil spring 210.

In the negative gain mode of fluid flow control, the fluid supply pressure supplied to a particular chamber 212 is effective to move the associated transmission spool valve 200 against the bias of the coil spring 210 from the minimum fluid flow spool position shown in FIG. 9 where the metering spool region 202 of the spool valve blocks the supply port 172b to a maximum fluid flow spool position wherein the control ports 180a and supply port 172b are communicated by the metering spool region 202.

Each proportional variable force solenoid fluid control valve 10 controls the axial position of its associated transmission spool 200 by reducing the supply pressure in chamber 212 communicated to the first axial spool valve end 200a so as to effect movement of armature 22 for engaging the ball valve 38 via armature nose 22g in proportion to the current level of the electric signal applied to the electromagnetic coil 16. For example, prior to admission of supply pressure to the chamber 212, each ball valve 38 is initially seated against the valve seat 18d. The fluid pressure in chamber 212 then can be reduced by opening ball valve 38 so as to divert fluid out of the exhaust port 174. This diversion of fluid from chamber 212 lowers the pressure in the chamber 212 and allows the spring 210 to move the spool valve 200 toward the minimum fluid flow spool position shown in FIG. 9 in proportion to armature movement which, in turn, is in direct proportion to the level of current applied to the coil 16 as explained hereabove. The unbalanced force on the spool ends 200a, 200b thus causes the spool valve 200 to move axially in proportion to the level of current applied to the coil 16. As a result, the fluid pressure at the control ports 180a is regulated in a manner to smooth shifting of the gears of the electronic transmission in response to the electrical signal representative of a shifting point. To this end, the control ports 180a are communicated to the fluid control system of the electronic transmission to provide smooth gear shifting. The fluid pressure at the control ports 180b is regulated to retain a correct force balance on the spool 67.

In FIG. 9, a conventional pressure-sensing membrane switch 205 is provided in a compartment 206 adjacent the housing 119 to determine whether fluid pressure is present in housing 119 and to provide an on/off signal to the electronic transmission control device (not shown) for use in its logic sequence for controlling transmission operation.

Although the proportional variable force solenoid valve 10 shown in FIG. 9 is similar to that illustrated with respect to FIGS. 1–4, the proportional variable force solenoid valve shown in FIG. 5 alternately can be employed in the embodiment of FIG. 9 to regulate fluid pressure at the control ports 180a in a manner to smooth shifting of the gears of the electronic transmission in response to the electrical signal representative of a shifting point.

A plurality of conventional invertor spool valves 250 also are disposed in the common valve housing 119 to provide required pressure signals to the transmission elements. The invertor spool valves 250 are designed by the transmission manufacturer to interface with the secondary transmission spool valves 200 in a manner dependent upon design of the overall transmission system beyond and not within the scope of the present invention. Various fluid ports 252a through 252h are provided in the housing 119 to communicate with each invertor spool valve 250 to this end.

Although certain preferred embodiments of the proportional variable force solenoid valve and fluid control device for an electronic transmission of the invention have been shown and described in detail, it should be understood that variations or modifications may be made without departing from the spirit or scope of the present invention.

I claim:

1. In a proportional variable force solenoid valve, the combination comprising:

a solenoid including an electromagnetic coil for receiving an electrical input signal for generating a variable electromagnetic field and having a longitudinal cylindrical bore hole, a cylindrical shaped permanent magnet armature consisting of permanent magnet material movable in said bore hole with a radial gap therebetween and comprising sole magnet means for generating a permanent magnetic field which interacts with said variable electromagnetic field to provide movement of said armature between first and second axial positions in proportion to the current level of said electrical input signal, means for disposing said armature in said bore hole for movement between said first and second axial positions in response to the current level of said electrical input signal, and means for biasing said armature toward said first position.

2. The proportional variable force solenoid valve of claim 1 wherein said armature comprises a cylindrical shaped rare earth permanent magnet.

3. The proportional variable force solenoid valve of claim 1 wherein said means for disposing said armature in said bore hole comprises a plate spring connected to an outer end of said armature.

4. The proportional variable force solenoid valve of claim 3 wherein an opposite inner end of said armature is guided for axial movement by a coil bobbin.

5. The proportional variable force solenoid valve of claim 4 wherein said coil bobbin includes a plurality of armature guide ribs in said bore hole, said armature guide ribs extending radially inwardly and longitudinally in said bore hole.

6. The proportional variable force solenoid valve of claim 1 including an unbroken, annular flux washer disposed proximate an end of a coil bobbin adjacent an end of said armature.

7. The proportional variable force solenoid valve of claim 1 wherein said biasing means comprises a coil spring disposed between an end of said armature and a cap closure member on said housing.

8. In a proportional variable force solenoid valve, the combination comprising:

a bobbin having a longitudinal bore hole, an electromagnetic coil disposed on the bobbin, an armature, a plate spring connected to an outer end of said armature for suspending said end of said armature in said longitudinal bore hole for movement between a first and second axial positions in response to a current level applied to said coil, said bobbin having a plurality of armature guide ribs in said bore hole proximate an opposite inner end of said armature, said armature guide ribs extending radially inwardly and longitudinally in said bore hole so as to guide movement of said armature between said first and second positions, and means for biasing said armature toward said first position.

9. The proportional variable force solenoid valve of claim 8 including an unbroken, annular flux washer disposed at an end of said bobbin proximate said opposite end of said armature.

10. The proportional variable force solenoid valve of claim 8 wherein said armature comprises a cylindrical shaped permanent magnet.

11. The proportional variable force solenoid valve of claim 8 wherein said armature comprises a ferromagnetic cylindrical shaped member.

* * * * *